(12) United States Patent
Wernersbach et al.

(10) Patent No.: US 11,305,800 B2
(45) Date of Patent: *Apr. 19, 2022

(54) CONTROLLED ARCHITECTURE FOR TRANSPORT SYSTEMS

(71) Applicant: ROCKWELL AUTOMATION, INC., Milwaukee, WI (US)

(72) Inventors: Glen C. Wernersbach, Cincinatti, OH (US); Keith G. Jacobs, Loveland, OH (US)

(73) Assignee: Rockwell Automation, Inc., Milwaukee, WI (US)

( * ) Notice: Subject to any disclaimer, the term of this patent is extended or adjusted under 35 U.S.C. 154(b) by 50 days.

This patent is subject to a terminal disclaimer.

(21) Appl. No.: 16/861,393

(22) Filed: Apr. 29, 2020

(65) Prior Publication Data

US 2020/0255043 A1 Aug. 13, 2020

Related U.S. Application Data

(63) Continuation of application No. 14/674,528, filed on Mar. 31, 2015, now Pat. No. 10,647,339, which is a
(Continued)

(51) Int. Cl.
*B61L 27/04* (2006.01)
*B60L 15/00* (2006.01)
*B60L 15/38* (2006.01)

(52) U.S. Cl.
CPC ............ *B61L 27/04* (2013.01); *B60L 15/005* (2013.01); *B60L 15/38* (2013.01);
(Continued)

(58) Field of Classification Search
CPC .. B61L 27/04; B61L 2210/04; B61L 2210/02; B60L 15/38; B60L 15/005; B60L 2200/26; B60L 2200/40
(Continued)

(56) References Cited

U.S. PATENT DOCUMENTS

| 4,549,597 A | 10/1985 | Hananura |
| 6,191,507 B1 | 2/2001 | Peltier et al. |

(Continued)

FOREIGN PATENT DOCUMENTS

| DE | 29816285 U1 | 1/2000 |
| DE | 10004988 C1 | 8/2001 |

(Continued)

OTHER PUBLICATIONS

Extended European Search Report for 21154773.2 dated Apr. 23, 2021, 10 pages.
(Continued)

*Primary Examiner* — Michael Collins
(74) *Attorney, Agent, or Firm* — Fletcher Yoder, P.C.

(57) ABSTRACT

Control architecture for use with transport systems, such as linear drive systems, rotary drive systems, or a combination thereof, comprising a computer system having a controller for operating control system software for receiving input commands and protocols for creating a motion profile for each transport element, and a gateway for receiving the motion profile from the control system software and for operating gateway drive software that functions to select the appropriate drives to move each transport element along one or more tracks in accordance with their motion profiles.

19 Claims, 7 Drawing Sheets

Related U.S. Application Data continuation of application No. 13/474,005, filed on May 17, 2012, now Pat. No. 8,996,161.

(60) Provisional application No. 61/488,012, filed on May 19, 2011.

(52) U.S. Cl.
CPC ....... *B60L 2200/26* (2013.01); *B60L 2200/40* (2013.01); *B61L 2210/02* (2013.01); *B61L 2210/04* (2013.01)

(58) Field of Classification Search
USPC .................................................. 700/230–244
See application file for complete search history.

(56) References Cited

U.S. PATENT DOCUMENTS

| | | | |
|---|---|---|---|
| 6,400,278 B1 | 6/2002 | Weyerstall et al. | |
| 6,459,965 B1 | 10/2002 | Polivka et al. | |
| 6,876,896 B1 | 4/2005 | Ortiz et al. | |
| 7,099,719 B2 | 8/2006 | Weinhofer et al. | |
| 7,456,593 B1 | 11/2008 | Floresta et al. | |
| 7,859,139 B2 | 12/2010 | Jacobs | |
| 8,076,803 B2 | 4/2011 | Jacobs | |
| 8,397,896 B2 * | 3/2013 | Kleinikkink | B65G 54/02 198/345.3 |
| 8,789,678 B2 * | 7/2014 | Kleinikkink | B65G 35/066 198/345.3 |
| 8,872,449 B2 | 10/2014 | Tojo et al. | |
| 8,996,161 B2 * | 3/2015 | Wernersbach | B60L 15/005 700/230 |
| 9,505,560 B2 * | 11/2016 | Kleinikkink | G05B 19/414 |
| 10,370,195 B2 * | 8/2019 | Huber | B65G 23/23 |
| 2003/0136086 A1 | 7/2003 | Kalany et al. | |
| 2003/0230941 A1 * | 12/2003 | Jacobs | B29C 66/1122 310/12.19 |
| 2005/0067995 A1 | 3/2005 | Weinhofer et al. | |
| 2010/0276256 A1 * | 11/2010 | Kleinikkink | B65G 35/066 198/793 |
| 2015/0203135 A1 | 7/2015 | Wernersbach et al. | |

FOREIGN PATENT DOCUMENTS

| | | |
|---|---|---|
| DE | 102009026326 A1 | 2/2010 |
| EP | 1232974 A1 | 8/2002 |
| EP | 1553000 A1 | 7/2005 |
| WO | 9627544 A1 | 9/1996 |
| WO | 0075603 A1 | 12/2000 |
| WO | 2011021544 A1 | 2/2011 |

OTHER PUBLICATIONS

Notice of Opposition in EP12786267.0 mailed Dec. 6, 2019, 26 pages.
International Search Report and Written Opinion for PCT/US12/38518 dated Aug. 3, 2012.
Extended European Search Report for Application No. 19152772.0 dated May 17, 2019, 6 pages.
Search Report for EP Application No. 12786267.0 dated Oct. 22, 2015, 8 pages.

* cited by examiner

CONTROLLED ARCHITECTURE FOR TRANSPORT SYSTEMS

CROSS-REFERENCE TO RELATED APPLICATIONS

This application is a continuation of U.S. patent application Ser. No. 14/674,528, filed Mar. 31, 2015, entitled "CONTROLLED ARCHITECTURE FOR TRANSPORT SYSTEMS," which is a continuation of U.S. patent application Ser. No. 13/474,005, filed on May 17, 2012, entitled "CONTROLLED ARCHITECTURE FOR TRANSPORT SYSTEMS," now U.S. Pat. No. 8,996,161, which claims the benefit of U.S. Provisional Patent Application No. 61/488,012, filed on May 19, 2011, entitled entitled "CONTROL ARCHITECTURE," all of which are incorporated by reference

TECHNICAL FIELD

The present invention is directed to control architecture and, more particularly, to control architecture for use with transport systems for moving articles from one location to another location.

BACKGROUND OF THE INVENTION

Conventional transport systems used in industry for moving articles from one location to another typically comprise rotary dive systems having mechanical components such as gears, shafts, keys, sprockets, chains and belts, rollers, and the like for moving an axis or transport element (such as a conveyor belt) that transports articles along a predetermined path or track. The rotary drives are controlled using a computer control system that operates control software to permit an operator to enter into the control system various command parameters that are used to create a motion profile for the transport element being utilized by the particular transport system.

Transport systems, such as controlled motion systems utilizing linear drives, are used in a wide variety of processes (e.g. packaging, assembly automation, processes involving use of machine tools, etc.) and provide the advantage over conventional rotary drive systems of increasing both the speed and the flexibility of the process. In particular, linear motors operate as magnetic drives creating a changing magnetic field to directly transport the axis or transport element along a defined track, thereby eliminating various conventional axes, such as gear heads, shafts, keys, sprockets, chains and belts, used with traditional rotary drive systems. The reduction of mechanical complexity over rotary drive systems provides both reduced cost and increased speed capability by virtue of reduced inertia, compliance, damping, friction and wear. Further, controlled motion systems utilizing linear drives also provide greater flexibility than conventional rotary drive systems by allowing one or more individual axes or transport elements to be independently controlled while transporting articles along an entire track.

Unlike conventional rotary drive systems that have a single drive for energizing an axis or transport element for moving articles along a track, linear motion systems typically comprise interconnected track sections wherein one or more drives are electrically coupled to a plurality of transport elements and have individually controlled coils that cooperate with one or more control units to energize or de-energize the coils to create magnetic fields effective for providing controlled motion of each transport element traveling along the track. Such systems also employ a plurality of linear encoder readers spaced at fixed positions along the track and sensors mounted on each transport element that cooperate with the linear encoder readers to provide signals to a control unit for use in determining the position of each transport element along the track.

Typically, control architecture utilized for conventional linear motion transport systems include an input device, such as a keypad, whereby an operator enters command parameters (such as the particular track identification, the speed that a transport element or axis travels along the track, stop and start locations, and time parameters for the transport element) into a control unit, such as a convention computer system, to create a motion profile. The control unit functions to operate software specifically designed for controlling the operation of the particular linear transport system being used. Unfortunately, the use of such specifically designed software for controlling a particular linear motion transport system often requires the operator to learn new software protocols for each new designed software package. Thus, for example, an operator using a plurality of different transport systems must learn to operate a number of different software packages.

Conventional control systems are typically designed for transport systems where transport elements do not move from one drive section to another dive section, such as when transport items are traveling along different tracks or move from one track to another track. Accordingly, a need exists for control architecture that can control transport elements moving from one drive to another drive, such as linear motion systems when a transport element moves from traveling along one track to traveling along another track or when it is desirable to control transport elements traveling along different tracks using a single control system.

Another problem often encountered with the use of specifically designed control software is that it is often desirable to have a transport system of one manufacturer coupled to the same control system being used by a transport system of another manufacturer. Accordingly, such a combined system eliminates the need for an operator to use two different control software packages thereby decreasing the cost and complexity of the transport systems. Further, the use of transport systems from different manufacturers often requires the operator to use more than one control system (or software package) or learn the operation of different software packages thereby increasing the training time for the operator and decreases the efficiency of the overall operation. In addition, the difficulty of integrating two different transport systems having two different control systems significantly increases the complexity and cost of the overall operation.

Accordingly, it is desirable to have a control architecture effective for controlling a transport system that has similar programmatic features as used in conventional single drive systems, such as rotary drive systems. It is also desirable to have control architecture effective for controlling a transport system that allows an operator to use traditional software for controlling conventional single drive transport systems; that can be used to control a transport system having more than one drive system; that can be used with linear drive systems whereby transport elements operate on different tracks; that allows additional independent drive systems to be easily incorporated into the transport system; allows a single control system to operate more than one transport system or a transport system having more than one track; and allows an operate to use traditional control software for a transport system having a single transport element for controlling a transport system having more than one transport element.

SUMMARY OF THE INVENTION

The subject invention is control architecture that can be used to control a multi drive transport system or a transport system having more than one transport element using control system software for controlling a single drive transport system or a transport system having a single transport element. A preferred embodiment of the invention the control architecture operates a transport system, such as a linear drive system or a combination of linear drive systems and rotary drive systems. Preferably, the control architecture comprises a computer system having a controller for operating control system software for receiving input commands and protocols creating a motion profile for directing a transport element along a track, and a gateway for receiving the motion profile from the control system software and for operating gateway drive software that operates select an appropriate drive system for moving the transport element along the track in accordance with the motion profile.

A preferred embodiment of the invention the control architecture functions to control at least one transport system having one or more drive systems each drive system having more than one transport element for movement along one or more tracks and comprises a computer system having control system software and a controller for operating the control system software for controlling a transport system having a single drive system, the control system software operates to receive input commands and protocols for each transport system and creates a motion profile for each transport element; a gateway for receiving said motion profile from the control system software for each transport element and having gateway drive software that operates to select the appropriate drive system for controlling the movement of each transport element along the one or more tracks in accordance with the motion profile.

In another preferred embodiment of the invention the control architecture the one or more drive systems comprise a rotary drive system, a linear drive system, or a combination thereof.

In another preferred embodiment of the invention the control architecture further comprises a positioning system that cooperates with the gateway drive software to track the location of each transport element and ensure that each transport element is directed in accordance with the motion profile.

In another preferred embodiment of the invention the control architecture further comprises a positioning system that cooperates with the gateway drive software to track the location of each transport element and ensure that one transport element does not interfere with another transport element.

In a preferred embodiment of the invention the control architecture for controlling at least one transport system having one or more drive systems, each drive system having more than one transport element for movement along one or more tracks and comprises a computer for operating control system software functioning as a single drive application software for controlling one or more independent single drive systems, each single drive system having a single transport element thereon, wherein the control system software operates to create a motion profile for each single transport element; and a gateway having gateway drive software that operates to identify the drive system for each single transport element and energize and de-energize the one or more drive systems such that the more than one transport element each move along the one or more tracks in accordance with the motion profile.

In a preferred embodiment of the invention the control architecture for controlling a transport system having at least one drive system for moving more than one transport element along a track, the control architecture effective for performing the method comprising the steps of using a computer system for operating a control system software that functions to receive information from an operator and create a motion profile for each transport element, wherein the motion profile for each transport element is for a single drive system for moving a single transport element; communicating the motion profile for each transport element to a gateway, the gateway operates gateway drive software that functions to operate the drive system for moving each transport element along the track in accordance with the motion profile for each transport element.

In a preferred embodiment of the invention the transport system comprises more than one track, each track having at least one transport element traveling thereon.

In another preferred embodiment of the invention the transport system comprises at least one track having more than one transport element traveling thereon.

In a preferred embodiment of the invention the drive system includes activation elements comprising individual electric coils positioned along the track for creating changing magnetic fields to directly move an axis or transport element along one or more of the tracks in accordance with the motion profile.

In a preferred embodiment the operating control system software is that typically used for a single drive system.

In a preferred embodiment of the invention the control architecture operates to control one or more transport systems.

In a preferred embodiment of the invention the transport system comprises more than one linear drive systems.

In a preferred embodiment of the invention the transport system comprises at least one linear drive system and at least one non-linear drive system.

In a preferred embodiment of the invention the transport system comprises a linear drive system, a non-linear drive system or a combination thereof.

In another preferred embodiment of the invention the gateway operates to monitor the position of each transport element as it travels along one or more tracks.

In another preferred embodiment of the invention the gateway operates to select the drive system for each transport element and operates to energize and de-energize the drive system to move each transport element in accordance with its motion profile.

Other advantages, objects, and embodiments of the invention will be apparent from the following description, the accompanying drawings and the appended claims.

BRIEF DESCRIPTION OF THE DRAWINGS

To provide a more complete understanding of the present invention and further features and advantages thereof, reference is now made to the following description taken in conjunction with the accompanying drawings, in which.

DETAILED DESCRIPTION OF THE INVENTION

Figure 1:
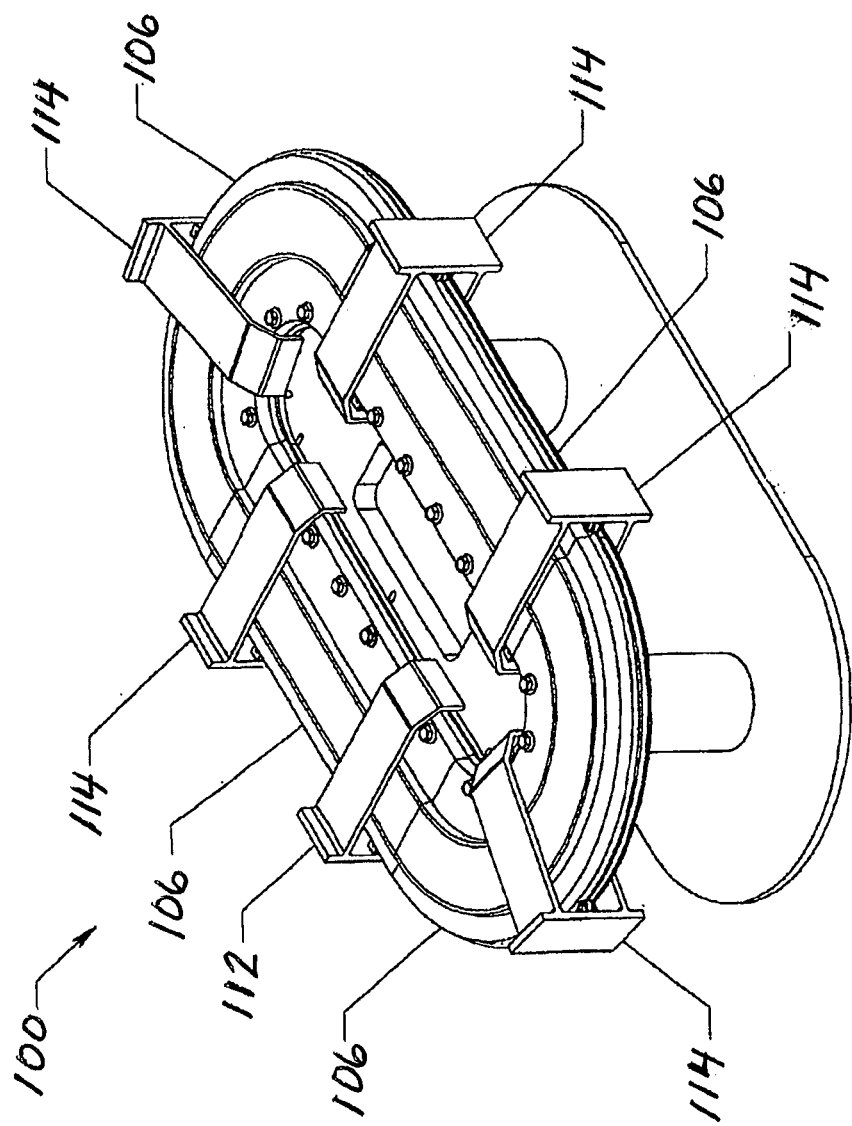
FIG. 1 is a schematic representation of a preferred embodiment of a transport system of the subject application whereby the transport system comprises a linear magnetic drive system comprising a track and more than one transport elements effective for moving articles along a track.

The present invention relates to control architecture for transport systems for receiving articles at one location and transporting the articles to another location. In describing the preferred embodiments of the invention illustrated in the drawings, specific terminology will be resorted to for the sake of clarity. However, the invention is not intended to be limited to the specific terms so selected, and it is to be understood that each specific term includes all technical equivalents that operate in a similar manner to accomplish a similar purpose.

Figure 2:
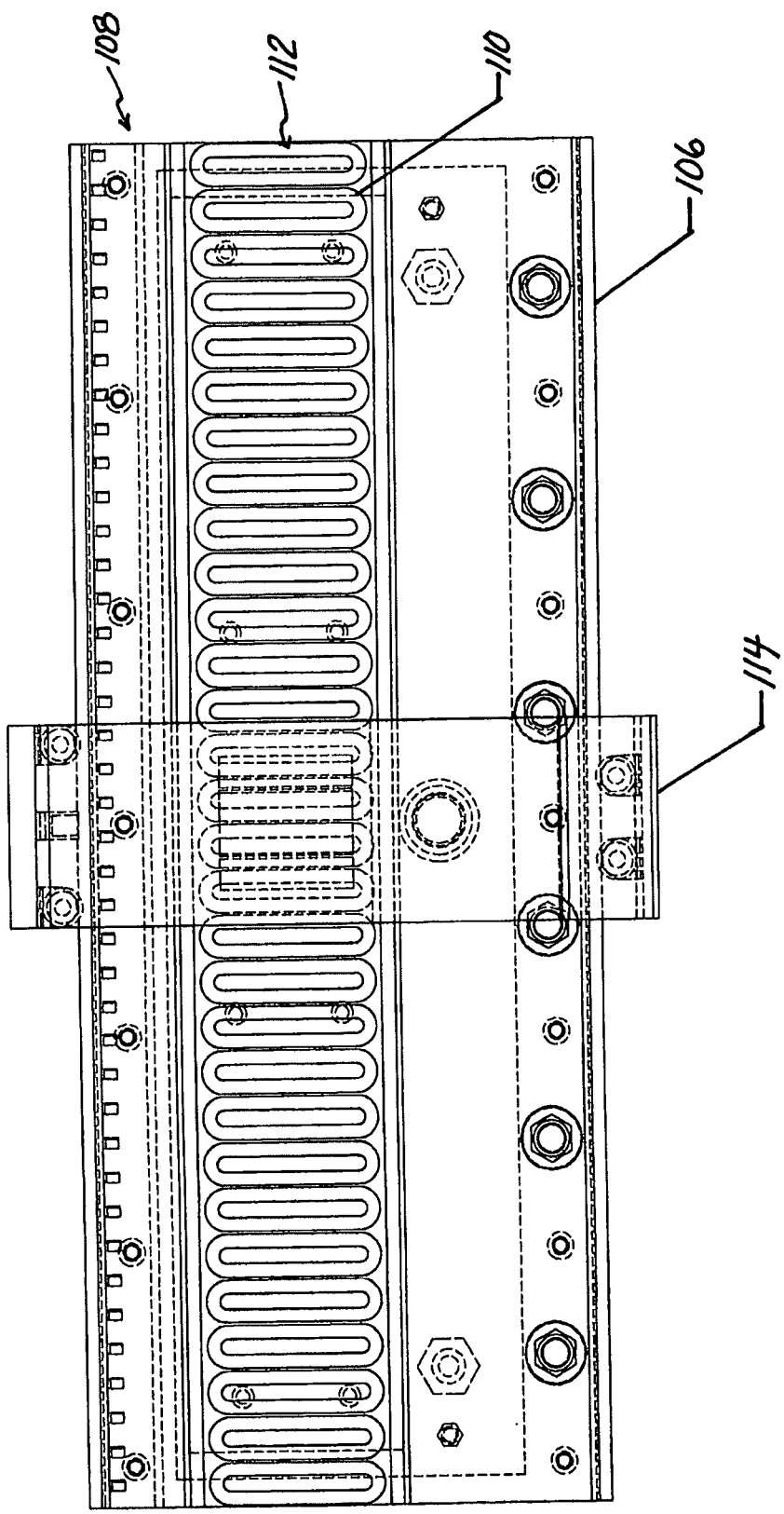
FIG. 2 is a schematic representation of the transport system of FIG. 1 showing a track segment having activation elements comprising a plurality of electrical coils effective for creating electromagnetic fields.
Figure 3:
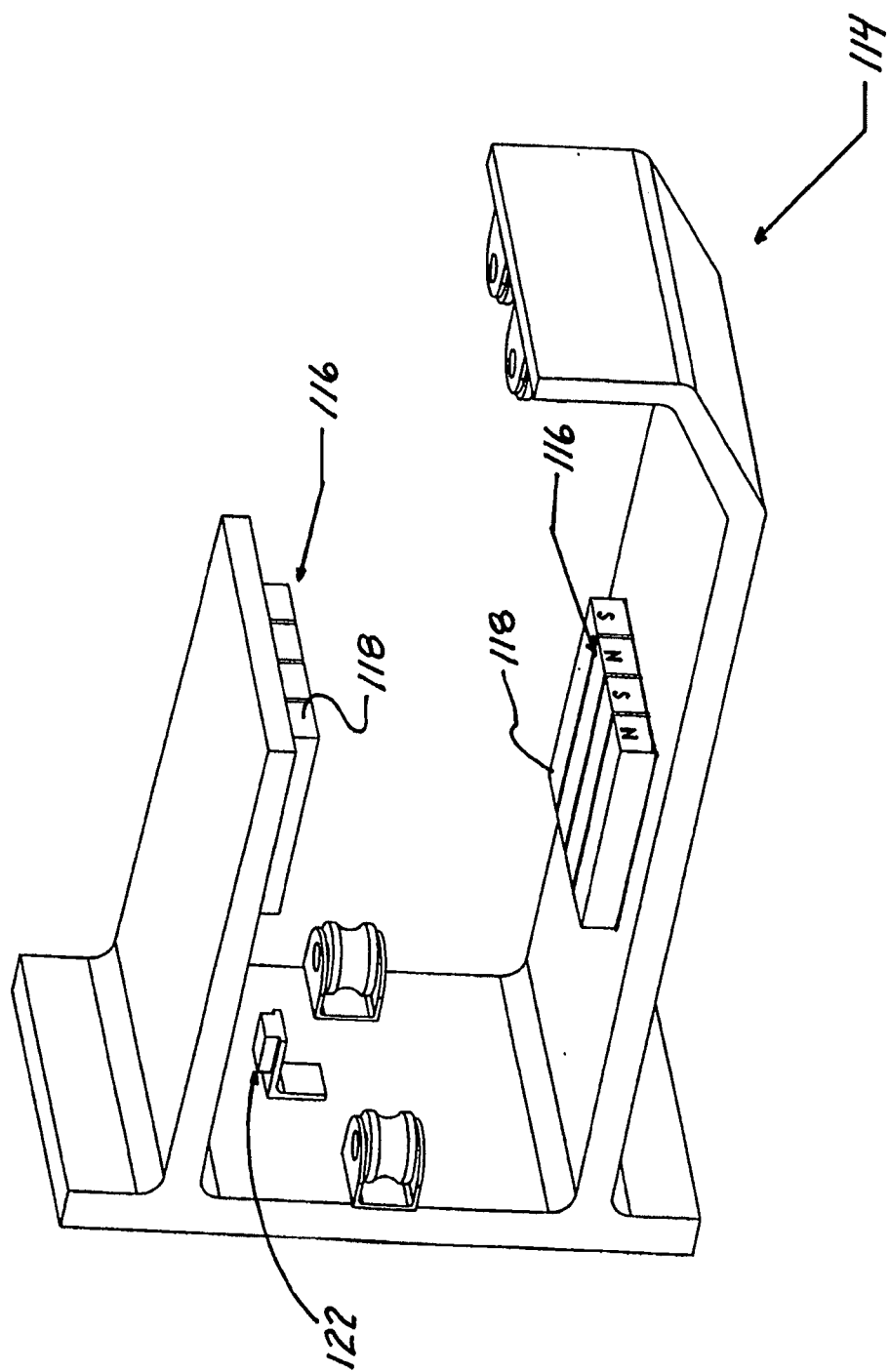
FIG. 3 is a schematic representation of a transport element of the transport system of FIG. 1 showing reactive elements positioned thereon for cooperating with the activation elements for moving the transport element along the track.
Figure 4:
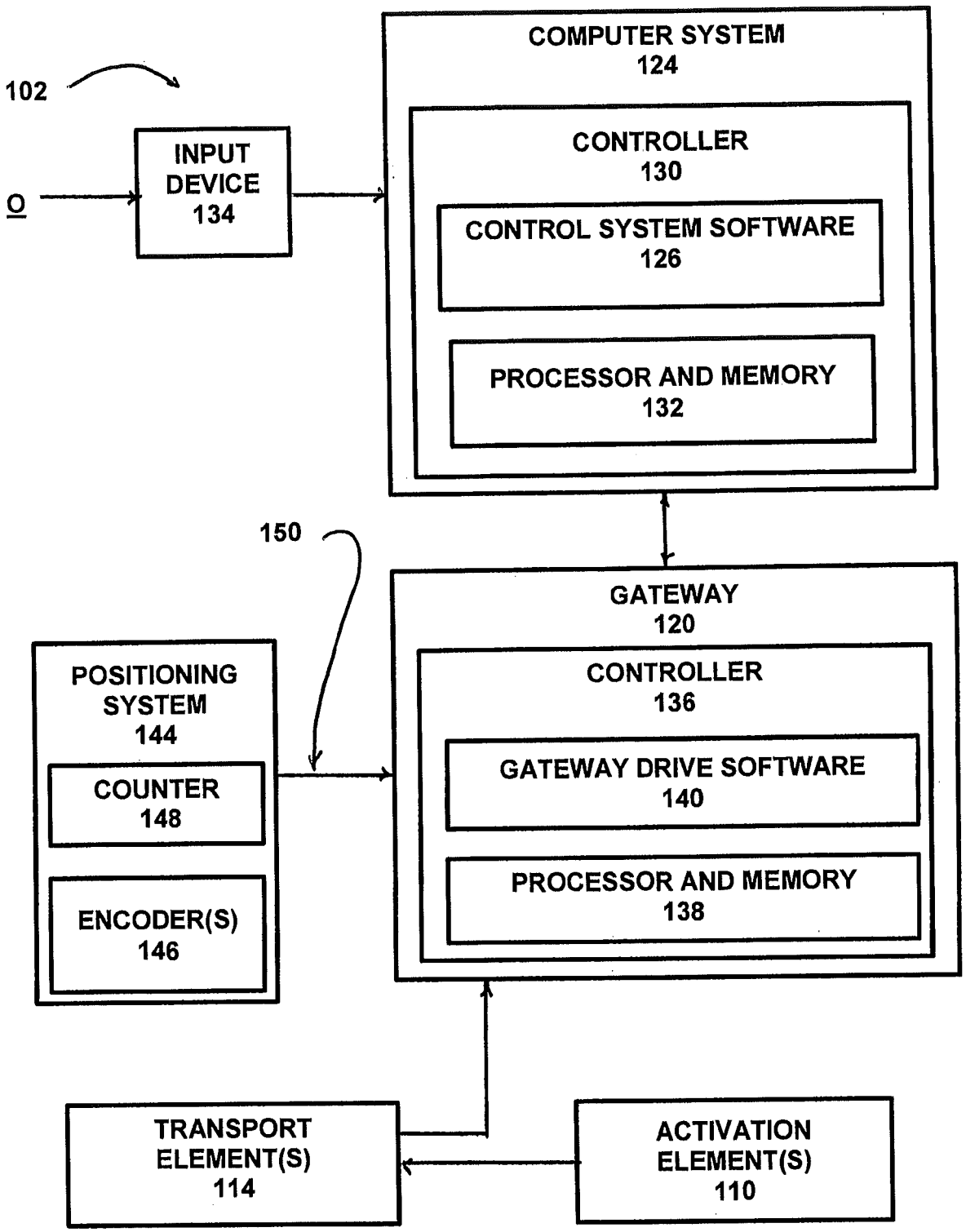
FIG. 4 is a schematic representation of a preferred embodiment of the control architecture of the subject invention for controlling a transport system having transport elements effective for moving articles from one location to another location and showing a computer system for use by an operator for inputting information to create a motion profile for each transport element and a gateway coupled to the computer system for operating the transport system in accordance with the motion profile.

Referring to FIGS. 1, 2 and 3, a schematic representation of typical transport system 100 for moving articles from one location to another location having a preferred embodiment of the control architecture of the subject invention 102 is shown (FIG. 4). In a preferred embodiment of the invention the transport system 100 is a linear magnetic drive system preferably includes a track 104 formed from interconnected track sections 106 having a drive system 108 comprising activation elements 110, such as a plurality of electromagnet coils 112, that operate by creating electromagnetic fields (FIG. 2). Coupled to the track 104 is one or more axis or transport elements 114 mounted to permit each transport element 114 to travel along the track 104 (FIG. 3). Each transport element 114 is movable independent of each other and includes reaction elements 116 preferably comprising one or more magnets 118, such as rare-earth permanent magnets, which cooperate with the activation elements 110 positioned along the track 104 to produce relative movement there between when the activation elements 110 are energized and/or de-energized. In a preferred embodiment, as shown in FIG. 4, the control architecture 102 includes a gateway 120 that is electrically coupled to the drive system 108 to operate and control the motion of each transport element 114. Each transport element 114 further includes a control sensor 122 (FIG. 3) that provides a signal for use by the gateway 120 for operating the drive system 108 by energizing and/or de-energizing the activation elements 110 positioned along the track 104 thereby producing controlled movement of each transport element 114.

In a preferred embodiment the control architecture 102 includes a computer system 124 or other similar system effective for implementing and operating control system software 126 that performs to permit an operator O to input commands and any desired protocols (such as the particular track identification, the speed that a transport element or axis travels along the track, and stop and start locations and length of time for the transport element) into the control architecture 102 to create a motion profile 128 for a transport element 114. The computer system 124 preferably includes a controller 130 having a processor and a memory 132 for operating the system software 126. It should be understood that the processor and memory 132 can comprise various computing hardware such as central processing units (CPU's), graphics processing units (GPU's), digital signal processors (DSP's), microprocessors and/or other such data processing devices. The computer system 124 further comprises other devices, such as a suitable input device, like a keypad, touch screen, or any other suitable input device 134 that can accept information from an operator O. The processor and memory 132 can include any of the usual devices used for the storage of data, such as computer hard drives, floppy discs, binary codes, optical bits, mechanical scribes, magnetic tapes, compact discs, digital audio tapes, analog tapes, vinyl discs, and any device or devices capable of storing data. It should be understood that the computer system 124 can include any combination of the above components, or any number of different components, peripherals, and other devices. Preferably, the computer system 124 operates under the control of an operating system, such as the WINDOWS operating system developed by Microsoft Corporation or the MACINTOSH operating system developed by Apple Computer Corporation. It should be understood, however, that other operating systems could be utilized to implement the control system software of the computer system of the present invention.

Referring to FIG. 4, gateway 120 of the control architecture 102 operates to receive the motion profile 128 from the control system software 126 of the computer system 124. As shown, the gateway 120 operates the drive system 108 by energizing or de-energizing the activation elements 110, such as individual electromagnetic coils 112, positioned along the track 104 create a moving magnetic field to directly move one or more of the axes or transport elements 114 along the track 104 in accordance with the motion profile 128.

Preferably, gateway 120 includes a controller 136 and a processor and a memory 138 that operates the gateway drive software 140. It should be understood that the processor and memory 138 can comprise various computing hardware such as central processing units (CPU's), graphics processing units (GPU's), digital signal processors (DSP's), microprocessors and/or other such data processing devices. The processor and memory 138 can include any of the usual devices used for the storage of data, such as computer hard drives, floppy discs, binary codes, optical bits, mechanical scribes, magnetic tapes, compact discs, digital audio tapes, analog tapes, vinyl discs, and any device or devices capable of storing data. Preferably, the processor and memory operates under the control of an operating system, such as the WINDOWS operating system developed by Microsoft Corporation or the MACINTOSH operating system developed by Apple Computer Corporation. It should be understood, however, that other operating systems could be utilized to implement gateway drive software of the present invention.

In a preferred embodiment, the computer system 124 is electrically coupled to the gateway 120 to permit communication there between. Referring to FIG. 4, an operator enters into the computer system 124, using the conventional input device 134, the various instructions and protocols needed to create a motion profile 128 for each transport element 114 for the particular transport system being utilized. Such instructions and protocols can include information such as the particular transport system and the particular axis or transport element(s). In a preferred embodiment of the invention, the control system software 126 is traditional software selected by the operator for controlling a transport system 100 having a particular drive system 108, such as a linear drive system comprising a single track and a single transport element operating thereon or a conventional rotary axis system having a single transport element. The computer system 124 being in electrical communication with the gateway 120 operates to transfer the motion profile 128 created by the control system software 126 using the instructions and protocols inputted by the operator using the input device 132 of the computer system 124. The gateway drive software 140 utilizing the motion profiles 128 operates to identify the particular transport system 100, the particular drive system 108 and the axis or transport element 114 and identifies and activates the identified drive system 108 (such as a particular linear magnetic drive system by energizing and de-energizing the activation elements) to direct and move one or more of the transfer elements along a track in accordance with their motion profile 128.

In a preferred embodiment the transport system 100 includes a positioning system 144 for determining and monitoring the position of each transport element 114 traveling along the track 104. In a preferred embodiment, the positioning system 144 is of the type typically used for a linear motion system (as shown) and includes "incremental absolute" position sensors or encoders 146 and counter 148 that operates by sensing and counting incremental pulses (or digitize sine/cosine signals to create these pulses) to count up or down after a transport element 114 travels past a reference point. It should be understood that the positioning system 144 can be used as part of a linear motion system having a single axis or transport element or as part of a linear motion system having multiple axis or transport elements and operates to track the position of each such transport system as it moves along the track. The positioning system 144 is electrically coupled to the gateway 120 and provides a position signal 150 for each transport element 114. It should also be understood however that other positioning systems that may be used for sensing the position of transport elements 114 moving along a linear motion system can also be utilized for such systems. The gateway 120 operates to use the position signal 150 for each transport element to 114, such as through a conventional feedback control loop, to ensure that the transport elements 114 are operating (traveling along the track or path) in accordance with the motion profile 128 as well as to ensuring the one transport element does not interfere with the movement of another transport element. For an example, the gateway cooperates with the positioning system to calculate time and position of each transport element in association with their motion profiles and operates to adjust the motion profiles to ensure that the transport elements traveling along a track do not make contact with other transport elements or otherwise restrict movement of another transport element.

Figure 5:
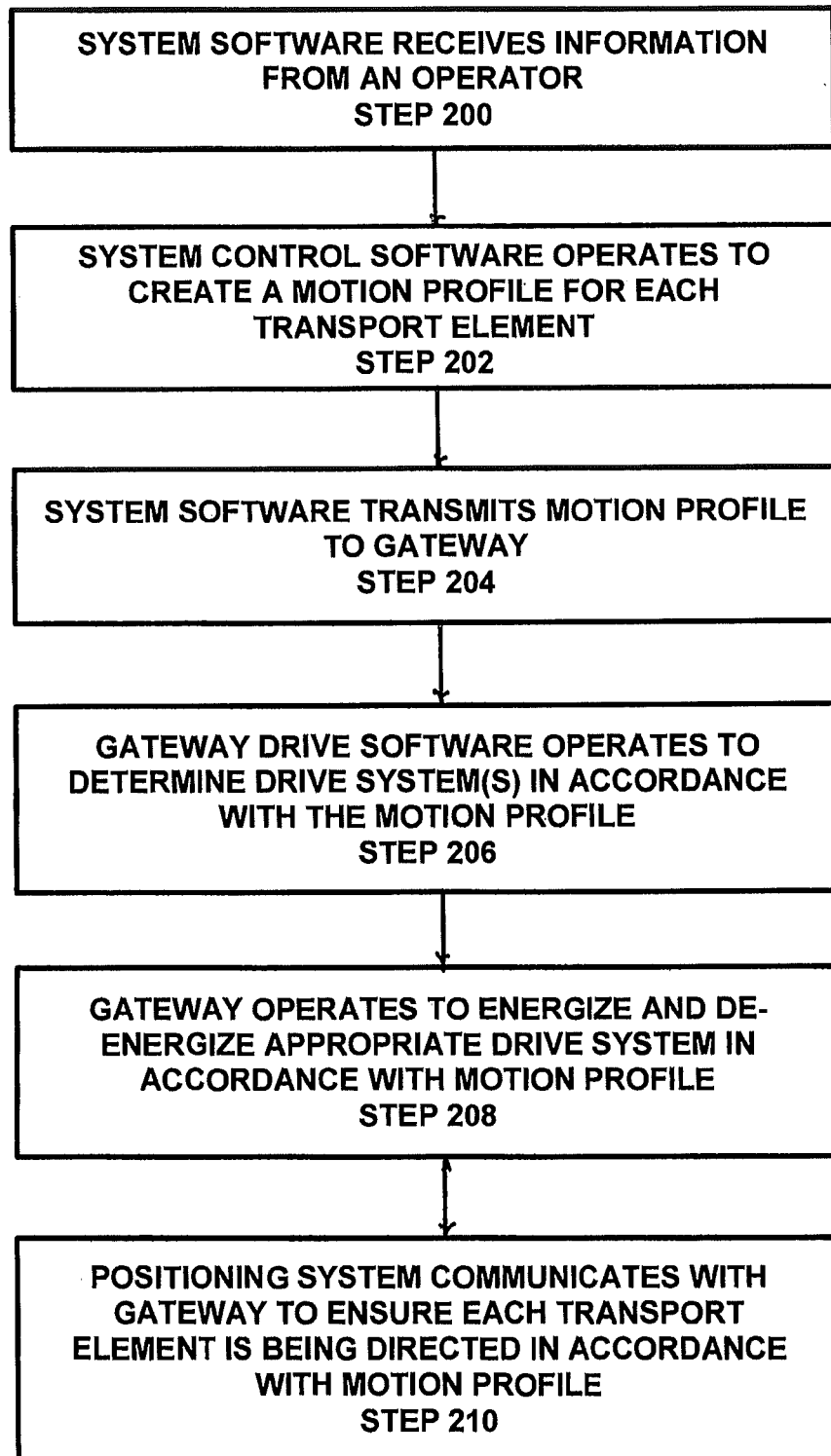
FIG. 5 is a flowchart depicting a method of operation of a preferred embodiment of the control architecture of the subject invention.
Figure 6:
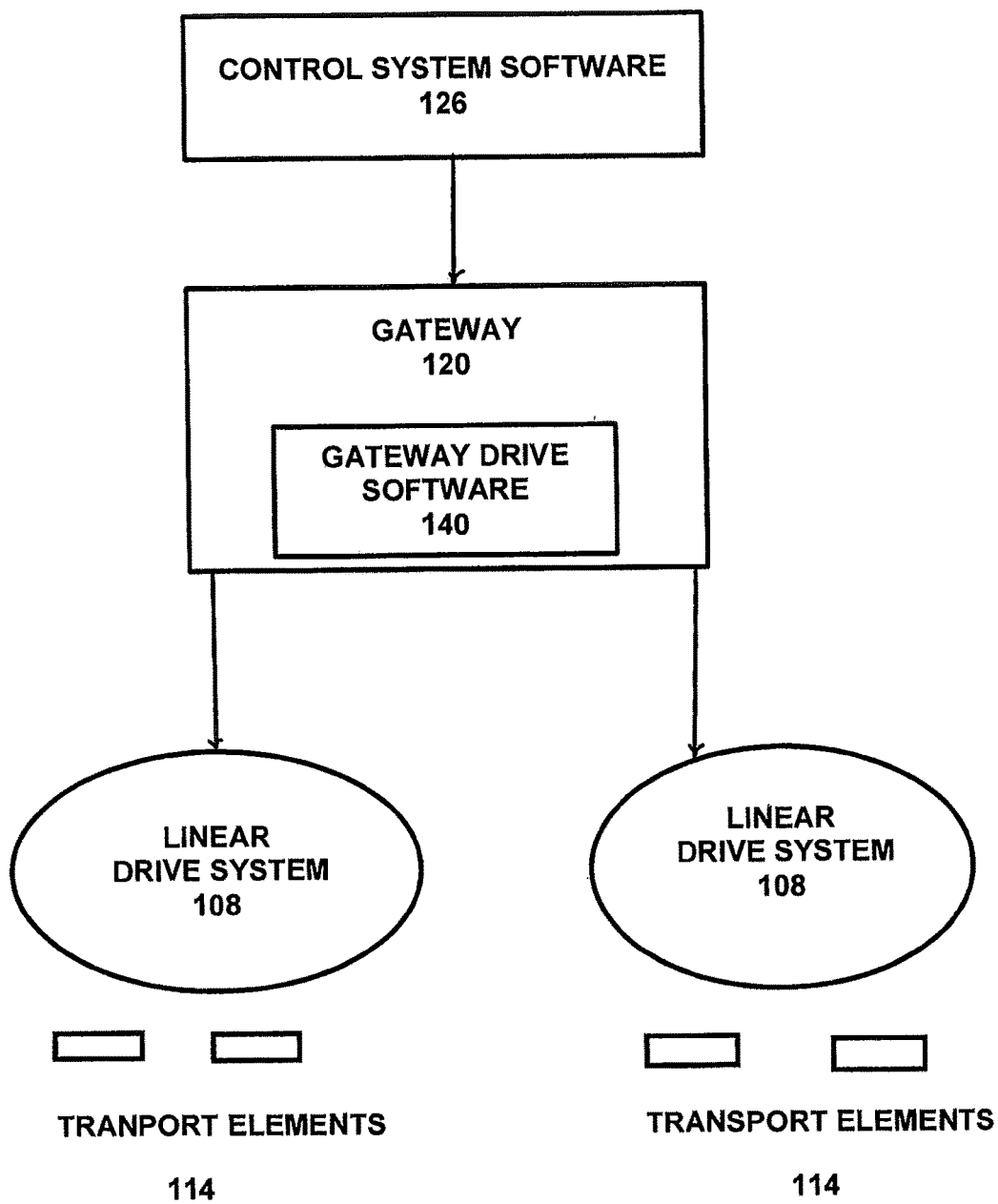
FIG. 6 is a schematic representation of another preferred embodiment of the invention showing the transport system comprising more than one linear magnetic drive system.

In a preferred embodiment of the invention the transport system 100 is a linear drive system comprising a track 104, more than one axis or transport elements 114, and a drive system 108 having one or more activation elements 110 positioned along the track 104, and one or more encoders 146 positioned along the track 104. Each transport element 114 is movably attached for traveling along the track 104. Referring to FIG. 5, in operation, the control architecture operates such that the system software receives information, including instructions and/or protocols, from an operator (step 200) and creates a motion profile for directing the operation of each transport element (step 202). It should be understood that the control system software is traditional software for use in conventional single drive transport systems, such as conventional rotary drive transport systems, having a single transport element. In a preferred embodiment the control system software is conventional control system software for controlling more than one rotary drive system each having a single transport element. An operator using the control system software inputs control parameters and other information for creating a motion profile for each transport element operating on each transport system. Once the instructions and/or protocols are entered into the computer system by the operator, the system software operates to create and direct a motion profile to the processor and memory of the gateway (step 204). The gateway drive software is configured to receive and utilize the motion profile and determines the particular transport system and/or drive system (step 206) and operates the gateway to energize and de-energize the identified drive system to move each transport element in accordance with its motion profile (Step 208). It should now be understood that unlike conventional control systems for single drive transport systems, such as conventional rotary drive systems, in which the transport system has a single transport element controlled by a single drive, the control architecture of the subject invention allows an operator to control one or more transport systems each having one or more transport elements operating thereon.

In a preferred embodiment of the invention the drive system includes a positioning system that operates to provide a signal to the gateway which functions as a feedback control loop for use by the gateway drive software for ensuring that each transport element is operating in accordance with its motion profile (step 210). It should also now be understood that the positioning system further permits the gateway drive software to monitor the location of each transport element traveling along each transport system and operates to ensure that the transport elements do not contact another transport element or otherwise interfere with the movement of another transport element.

For another illustrative example of a preferred embodiment of the method of the subject invention, the identified drive system is a conventional linear motion drive system. The gateway control software operates to energize and de-energize the activation elements along the track that cooperate with the reaction elements on the individual transport elements to move the each transport element along the track in accordance with the motion profile for the particular transport element. The positioning system cooperates with the control sensor on each of the transport elements to provide a signal to the gateway effective for monitoring the location of each transport element and ensure that the transport elements are directed in accordance with the motion profile without interfering with another transport element.

It should now be apparent to one skilled in the art that the control architecture of the subject invention operates to allow a motion profile to be created using conventional control system software for a transport system having a single transport element and using a conventional single drive (such as a rotary drive system) to create motion profiles for transport systems having more than one drive and/or more than one transport element. In operation, the gateway of the subject invention operates to receive the motion profile for each transport element, determines the drive system for driving each transport element, and controls the drive system in accordance with the motion profile for each transport element. Accordingly, it should now be apparent to one skilled in the art that the control architecture of the subject invention operates such that it appears to the operator that each transport element is operating on its own independent drive system thereby allowing the operator to create motion profiles for multiple drive and/or multiple independently controlled transport elements by input information using conventional system software for controlling a single drive, signal transport element systems.

Figure 7:
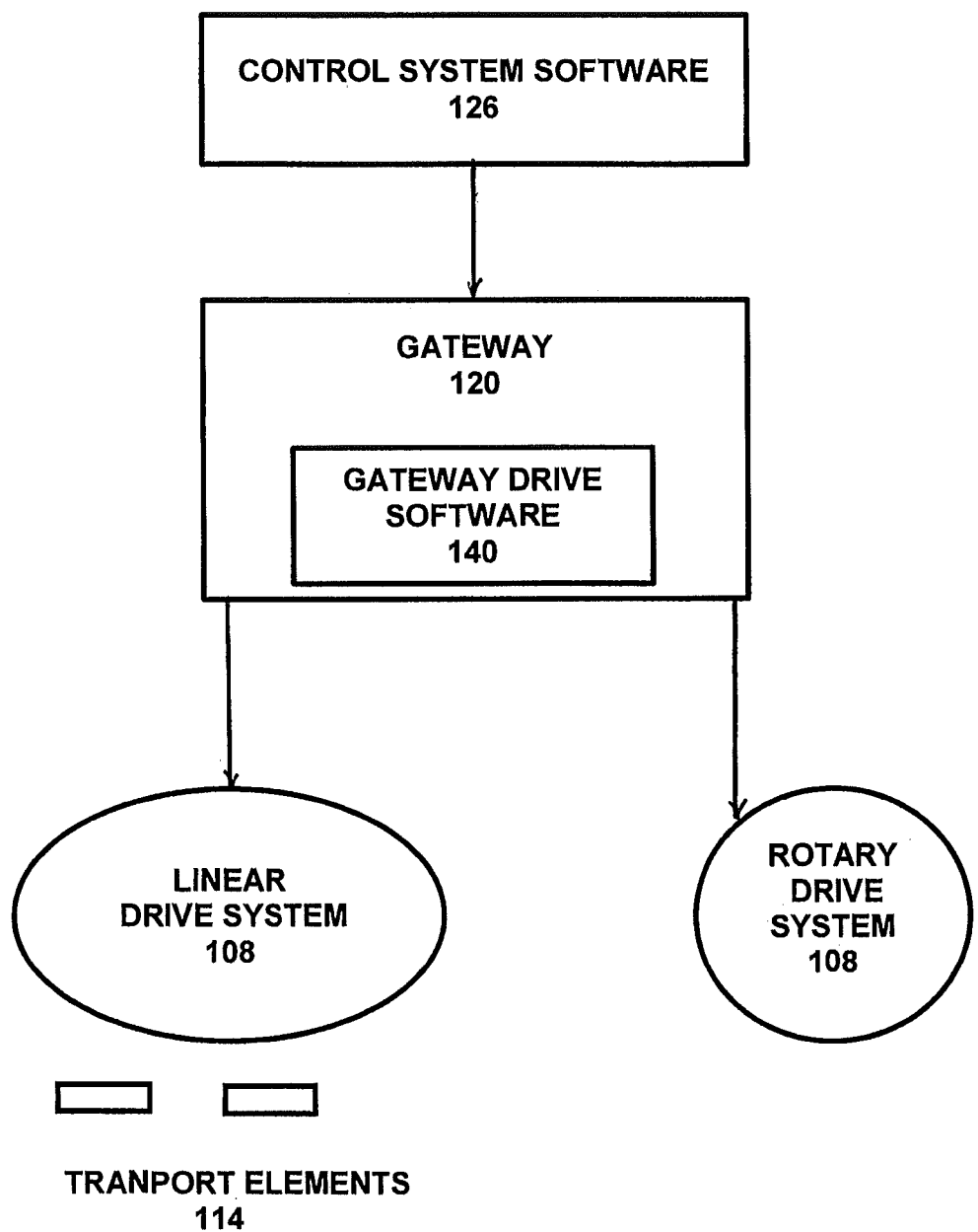
FIG. 7 is a schematic representation of another preferred embodiment of the invention showing the transport system comprising a combination of at least one linear magnetic drive system and at least one rotary drive system.

In another preferred embodiment of the invention the transport system comprises a transport system 100 having a drive system 108, such as a linear drive system, having more than one track 104 and activation elements 110 positioned along each track 104, and one or more encoders 146 also positioned along each track 104. One or more transport elements 114 are movably attached for traveling along each track 104. Referring to FIG. 7, in operation, the control architecture operates such that the control system software receives information, including instructions and/or protocols for directing the operation of each transport element from an operator (step 200) and creates a motion profile for each transport element (step 203). It should be understood that the control system software is traditional software for use in conventional single drive transport systems, such as conventional rotary drive transport systems or a single linear dive system, having a single transport element. Accordingly, the operator inputs instructions and/or protocols into the control system software as if each transport element was operating on a separate single drive transport system having a single transport element. Once the instructions and/or protocols are entered into the computer system by the operator, the control system software operates to communicate the motion profiles to the gateway (step 204). The gateway drive software is configured to receive and utilize the motion profiles and operates to select the particular transport elements (step 206) and energize and de-energize the activation elements positioned along the track that cooperates with the reaction elements on the individual selected transport elements to move each transport element along the track (step 208). The positioning system for each linear motion drive system cooperates with the control sensor on each transport element to provide signals to the gateway to track the location of each transport element and ensure that the transport elements are directed in accordance with their motion profile (step 210). It should now be understood that the control architecture of the subject invention operates such that the gateway can direct an individual or a plurality of independent or dependent transport systems based on the motion profile.

It should now be apparent to one skilled in the art that the control architecture of the subject invention can be used in conjunction or as part of a transport system comprising one or more linear drive systems and one or more rotary drive systems, or any combination thereof. Further, the control architecture of the subject invention can comprise two separate components, such as a separate computer system for operating the control system software and a separate gateway for operating the gateway drive software or can comprise a single component operating both the control system software and the gateway drive software such that a single processor or multiple processors operating both the control system software and the gateway drive software. It should also now be apparent to one skilled in the art that the control architecture of the subject invention can incorporate traditional software typically used for inputting and controlling conventional single drive systems, such as a conventional rotary drive system, to allow an operator to input information and/or instructions. Accordingly, an operator using traditional control software for a signal drive system can input control protocols and instructions for creating a motion profiles for a drive system having a plurality of transport elements. In another preferred embodiment of the invention the operator enters specific drive (or drive system) identification and information directed to that specific drive. The operator can continue adding information for each specific drive identified to be within a specific transport system until all the information has been entered. The system software then operates to create a motion profile and transmits the motion profile to the gateway. The gateway then operates to identify the particular drive system and directs the transport element(s) identified for each specific drive in accordance with the motion profile. It should now be apparent that the computer software operates as if there is one transport element for each drive system while the gateway permits multiple transport elements to operate on one or more drive systems.

It should now be apparent to one skilled in the art that the control architecture of the subject invention operates to allow a motion profile to be created for a transport system having more than one drive and/or more than one track and/or more than one axis or transport element using conventional software for creating a motion profile for a transport system comprising a single rotary drive system, or a multiple rotary drive system, or a linear drive system having a single track and one or more axis or transport elements moving along the track, or a linear drive system having more than one track with one or more axis or transport elements moving along each track.

It should now be apparent to one skilled in the art that the control architecture of the subject invention is effective for controlling a transport system that has similar programmatic features as used in conventional single drive systems having a single transport element. It should also now be apparent that the control architecture of the subject invention is effective for controlling a transport system that allows an operator to use traditional software for controlling conventional single drive, single transport element systems; can be used to control a transport system having more than one drive system; can be used with linear drive systems whereby transport elements operate on different tracks; that allows additional independent drive systems to be easily incorporated into the transport system; allows a single control system to operate more than one transport system or a transport system having more than one track; and allows an operate to use traditional control software to control one or more transport elements. Accordingly, in a preferred embodiment the control architecture of the subject invention operates such that linear drive systems (having one or more transport elements moving thereon) are virtualized to look and controlled such that the perceived view of the operator is such that it appears to be one or more rotary drive systems (one system for each transport element).

While the method and apparatus described constitute preferred embodiments of the invention, it is to be understood that the invention is not limited to the precise method and apparatus, and that changes may be made therein without departing from the scope of the invention which is defined in the appended claims.

What is claimed is:

1. A system comprising:
a linear motor transport system comprising a linear motor track and a plurality of linear motor movers disposed and movable along the track;
a rotary drive system; and
control circuitry coupled to the linear motor transport system and to the rotary drive system and configured to receive motion profiles for each linear motor mover and for the rotary drive system as independent control axes, and to select and apply control signals to the linear motor transport system and to the rotary drive system to control components of the linear motor transport system and to the rotary drive system as independent control axes;
wherein the control circuitry comprises a gateway that in operation executes gateway drive software to drive the linear motor transport system and the rotary drive system.

2. The system of claim 1, comprising an operator workstation for inputting the motion profiles.

3. The system of claim 1, wherein the control circuitry is configured to control and locate each of the plurality of linear motor movers to avoid interference between the linear motor movers along the track.

4. The system of claim 1, wherein the linear motor track comprises a plurality of motor coils, and wherein the control circuitry is configured to control application of control signals to the plurality of motor coils to control movement of the linear motor movers along the track.

5. The system of claim 4, wherein the track forms a closed loop.

6. The system of claim 1, wherein the control circuitry locates the linear motor movers by reference to feedback data generated by a sensor system.

7. The system of claim 1, wherein the sensor system comprises passive elements carried by the linear motor movers and a series of static sensors along the continuous track.

8. The system of claim 1, wherein the control circuitry comprises first processor that generates the motion profiles, and a second processor that generates command signals for the linear motor transport system and to the rotary drive system based on the motion profiles.

9. The system of claim 1, wherein the motion profiles are based upon information and/or instructions input by an operator.

10. A system comprising:
a linear motor transport system comprising a linear motor track and a plurality of linear motor movers disposed and movable along the track;
a rotary drive system;
an operator workstation for inputting information and/or instructions for motion profiles for components of the linear motor transport system and the rotary drive system; and
control circuitry coupled to the linear motor transport system and to the rotary drive system and configured to the receive motion profiles as independent control axes, and to select and apply control signals to the linear motor transport system and to the rotary drive system to control components of the linear motor transport system and to the rotary drive system as independent control axes;
wherein the control circuitry comprises a gateway that in operation executes gateway drive software to drive the linear motor transport system and the rotary drive system.

11. The system of claim 10, comprising feedback control loops coupled to the control circuitry to determine positions of the components.

12. The system of claim 10, wherein the control circuitry comprises multiple separate processors to generate the motion profiles, and to generate command signal for the linear motor transport system and to the rotary drive system based on the motion profiles.

13. The system of claim 10, wherein the control circuitry is configured to control and locate each of the plurality of linear motor movers to avoid interference between the linear motor movers along the track.

14. A non-transitory processor-readable storage medium having stored thereon processor-executable software instructions configured to cause one or more processors to perform operations comprising:
accessing motion profiles for a plurality of linear motor movers of a linear motor transport system and for a rotary drive system as independent control axes; and
generating control signals for the linear motor transport system and for a rotary drive system as independent control axes in accordance with the motion profiles;
wherein the control signals are generated by control circuitry comprising a gateway that in operation executes gateway drive software to drive the linear motor transport system and the rotary drive system.

15. The medium of claim 14, wherein the motion profiles are defined by an operator.

16. The medium of claim 14, wherein the processor-executable software instructions are configured to cause the one or more processors to generate the motion profiles based upon information and/or instructions input by an operator on a workstation.

17. The medium of claim 14, wherein the processor-executable software instructions are executed on multiple separate processors to generate the motion profiles, and to generate command signal for the linear motor transport system and to the rotary drive system based on the motion profiles.

18. The medium of claim 14, wherein the processor-executable software instructions are configured to cause the one or more processors to apply the control signals to drive circuitry for the linear motor transport system and for a rotary drive system as independent control axes in accordance with the motion profiles.

19. The medium of claim 18, wherein the processor-executable software instructions are configured to cause the one or more processors to determine positions of components of the linear motor transport system and the rotary drive system based upon feedback control loops.

* * * * *